(12) United States Patent
Grycko et al.

(10) Patent No.: US 9,108,478 B2
(45) Date of Patent: Aug. 18, 2015

(54) TIGHTENING MECHANISM FOR TRAILER DRAWBAR HINGE ASSEMBLY AND METHOD OF USING SAME

(71) Applicant: Premier Equipment, Inc., Tualatin, OR (US)

(72) Inventors: Paul Grycko, Lake Oswego, OR (US); Zachery D. McCurter, Portland, OR (US)

(73) Assignee: Premier Equipment, Inc., Tualatin, OR (US)

( * ) Notice: Subject to any disclaimer, the term of this patent is extended or adjusted under 35 U.S.C. 154(b) by 0 days.

(21) Appl. No.: 13/927,558

(22) Filed: Jun. 26, 2013

(65) Prior Publication Data

US 2015/0001831 A1    Jan. 1, 2015

(51) Int. Cl.
*B60D 1/36* (2006.01)
*B60D 1/48* (2006.01)
*E05D 5/02* (2006.01)

(52) U.S. Cl.
CPC . *B60D 1/481* (2013.01); *E05D 5/02* (2013.01); *E05Y 2900/516* (2013.01)

(58) Field of Classification Search
CPC .............................. E05D 5/02; E05Y 2900/516
USPC ................................ 280/477, 479.3, 498, 495
See application file for complete search history.

(56) References Cited

U.S. PATENT DOCUMENTS

| | | | |
|---|---|---|---|
| 5,765,851 A * | 6/1998 | Parent | 280/491.4 |
| 6,637,760 B1 * | 10/2003 | Carman | 280/32.7 |
| 7,798,241 B2 * | 9/2010 | Muzzy et al. | 172/7 |
| 2010/0014918 A1 * | 1/2010 | Halvorson | 404/95 |

OTHER PUBLICATIONS

Premier Manufacturing Co.'s "Installation, Inspection, Operation & Maintenance Guide for Model 320/320A Hinge Assembly," pp. 1-12 (2009).
Premier Manufacturing Co.'s "Installation, Inspection, Operation & Maintenance Guide for Models 440/440A & 455/455A Hinge Assemblies," pp. 1-14 (2009).

* cited by examiner

*Primary Examiner* — Joseph Rocca
*Assistant Examiner* — Marlon Arce
(74) *Attorney, Agent, or Firm* — Klarquist Sparkman, LLP

(57) ABSTRACT

A tightening mechanism for a hinge assembly includes a first housing having a pair of outwardly extending spaced apart ears having aligned first bores extending through them. A second housing has a length which allows it to fit between the ears and has a pair of abutting second bores which are tapered inwardly toward one another. Tapered cylindrical bushings are configured to fit within the second bores. The tapered bushings have aligned third bores which are co-axial with one another and with the second bores. A coupling mechanism extends through the third bores and holds the second housing rotatably in the first housing. A clamping mechanism urges the bushings toward one another and inwardly into the second bores against the pin.

6 Claims, 3 Drawing Sheets

TIGHTENING MECHANISM FOR TRAILER DRAWBAR HINGE ASSEMBLY AND METHOD OF USING SAME

BACKGROUND

This invention relates to a trailer drawbar hinge, and in particular to a tightening mechanism for setting resistance against rotation of the hinge.

When vehicles include multiple trailers the following trailer sometimes is attached to the preceding trailer through a drawbar having a pair of hinge assemblies which allows the drawbar to be lifted on to and off of the pintle of the trailer coupling mounted at the back of the preceding trailer. These hinge assemblies contain a tightening mechanism which allows applying a desired level of resistance against the rotation of the hinge assembly. Examples of these prior art hinges are the Premier Equipment models 320, 440 and 455 hinges. The 450 and 455 hinges provide the resistance by squeezing a pair of bushings radially against a pin which extends through a hole in the bushings. The 320 hinge provides the resistance by pushing a tapered pin into a tapered bore in the bushing. With the former, it is difficult to accurately exert the desired pressure on the pin by the squeezed bushing and with the latter the bushings do not remain centered in the hinge as the amount of resistance is increased.

BRIEF SUMMARY

The subject invention includes a hinge having a housing which has abutting bores that are tapered inwardly toward one another and a pair of compressible tapered bushings which are configured to fit within these bores. An elongate cylindrical pin extends through holes located in the bushings. A tightening mechanism urges the bushings toward one another into these abutting bores thereby compressing the bushings and squeezing them against the pin.

BRIEF DESCRIPTION OF THE SEVERAL DRAWINGS

DETAILED DESCRIPTION OF PREFERRED EMBODIMENTS

Figure 1:
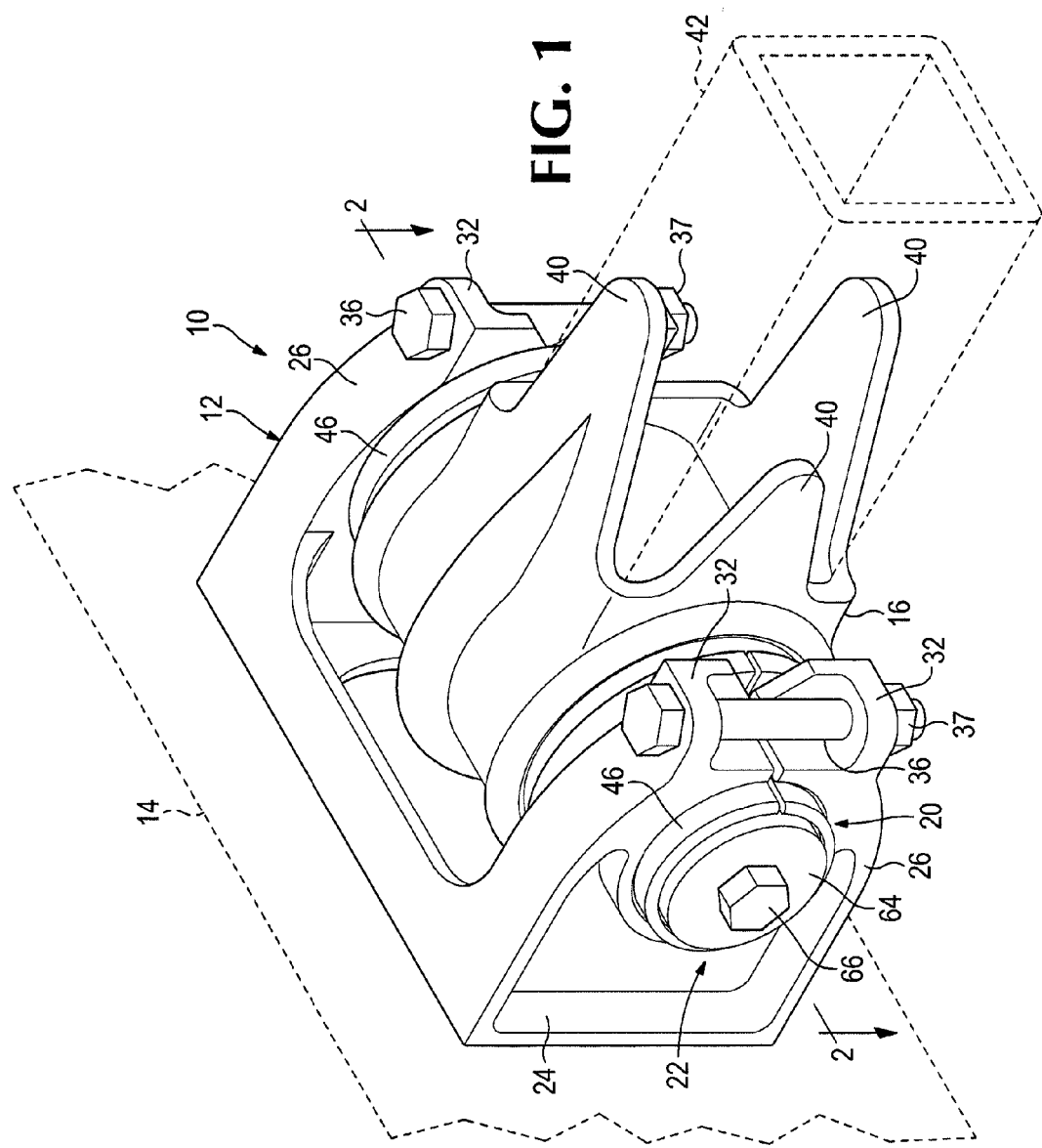
FIG. 1 is a perspective view of a trailer drawbar hinge embodying the tightening mechanism of the subject invention.
Figure 2:
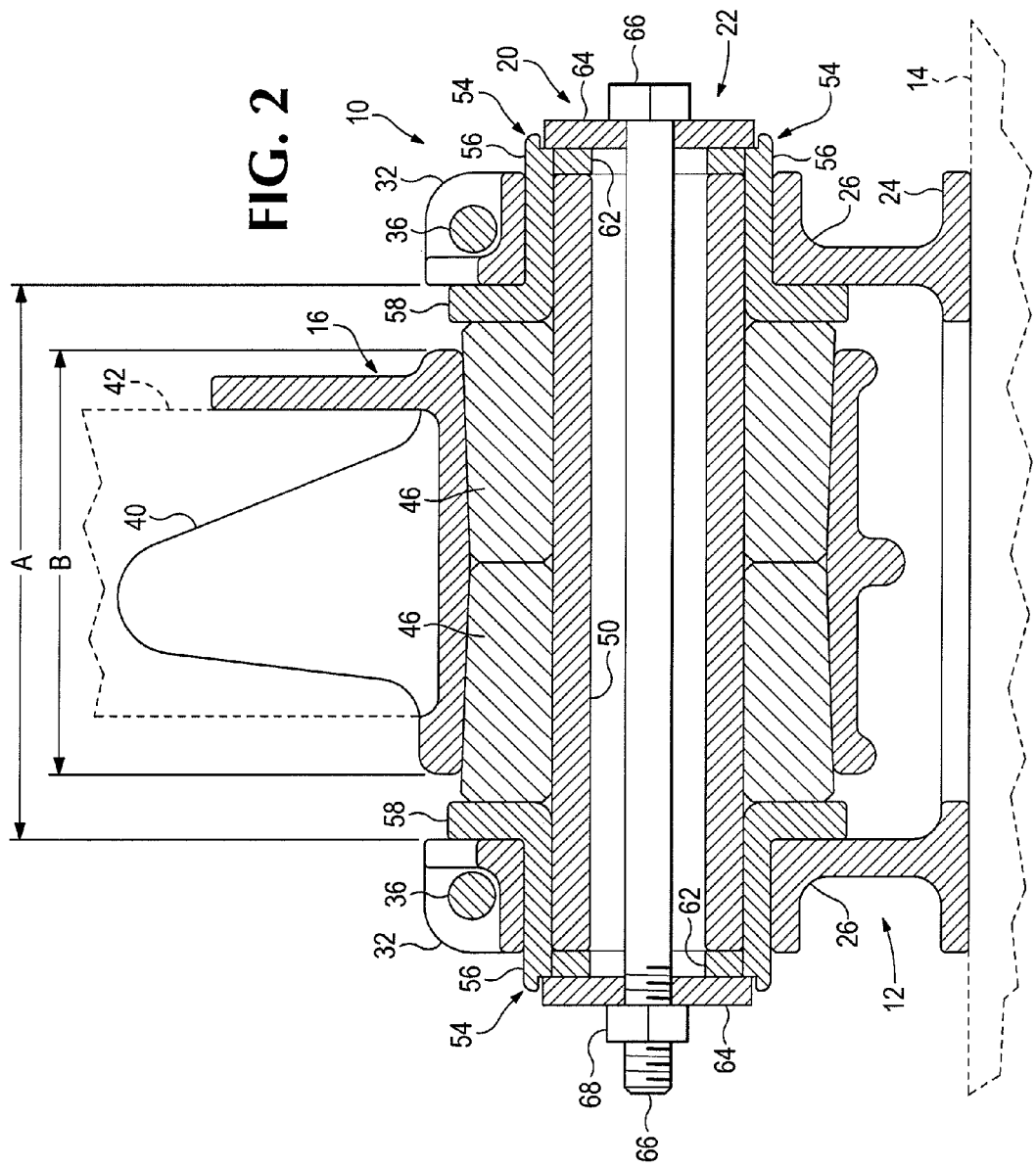
FIG. 2 is a cross-sectional view taken on the lines 2-2 of FIG. 1.
Figure 3:
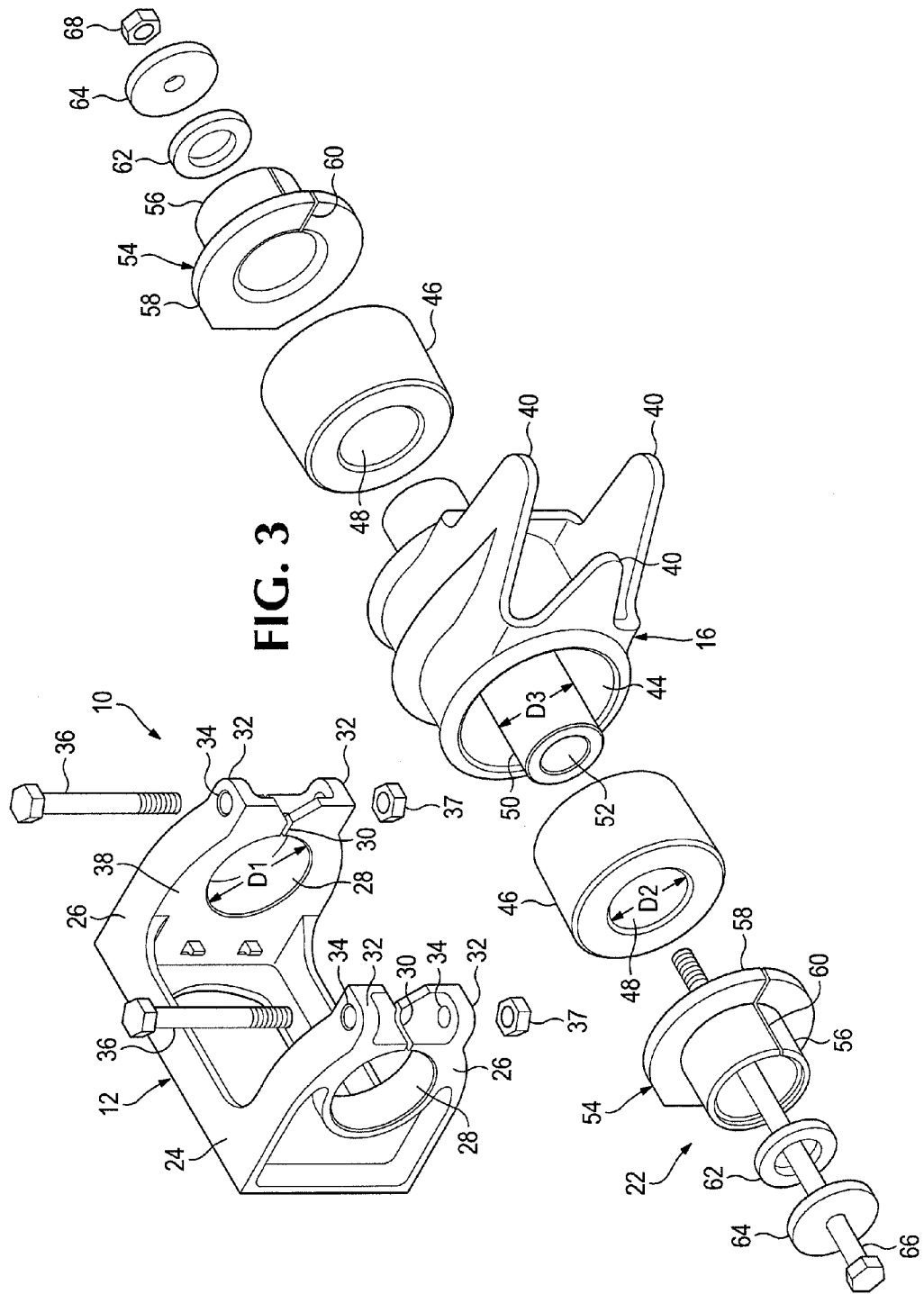
FIG. 3 is an exploded view of the trailer drawbar hinge of FIG. 1.

Referring now to FIG. 1 of the drawings, a trailer drawbar hinge 10 has a first housing 12 which is attached to the front of a trailer or dolly 14, and a second housing 16 which is attached to a drawbar 42 that is attachable to a preceding trailer. A hinge assembly 20 interconnects the housings and allows the second housing to rotate relative to the first housing about a horizontal axis to allow the drawbar 42 to be lifted on to and off of a trailer coupling (not shown) mounted at the rear of the preceding trailer. As will be explained more fully, the hinge includes a tightening mechanism 22 which provides for adjustment of the resistance applied against this rotation.

The first housing 12 includes a frame 24, which is attached to the front end of a trailer or dolly 14. Extending outwardly from each end of the frame 24 is an ear 26. The ears 26 have inwardly facing planar faces 38 which are separated from one another by the distance A. Aligned first bores 28, having a diameter D1, extend through the ears 26. Slots 30 open out of the first bores 28 through the tops of the ears 26. Flanges 32 on each side of the slots contain aligned holes 34. Bolts 36 extend through the holes into threaded engagement with nuts 37. Tightening the bolts in the nuts reduces the size of the slots 30.

The second housing 16 has a length B which is slightly less than the distance A between the faces 38 of the ears 26. The second housing has flanges 40 which are configured to receive the drawbar 42. The drawbar 42 typically is attached to the flange 40 by welding. A pair of aligned abutting second bores 44 are located in the second housing. The second bores 44 are tapered, having a smaller diameter where they abut one another at the center of the second housing and a larger diameter where they open out of the second housing. A pair of tapered compressible elastomeric bushings 46 are configured to fit snuggly in the second bores 44. The bushings have a combined length which is slightly greater than the length B of the second housing, but slightly less than the distance A between the faces 38 of the ears 26. The bushings have aligned third bores 48 which extend through them. The third bores 48 are coaxial with the second bores 44 and have an inner diameter D2. The second housing is located within the first housing with the second and third bores coaxial with the first bores. An elongate cylindrical pin 50 extends through the third bores 48 in the bushings 46 to rotatably couple the second housing 16 in the first housing 12. The pin 50 has an outside diameter D3 which is substantially equal to diameter D2 of the third bores 48, and a length which allows it to extend through both ears 26. The pin 50 has a hole 52 extending through it. Located at each end of the pin 50 is a collar 54. The collars are L-shaped in cross-section. A cylindrical axial leg 56 has an inside diameter which is substantially equal to the outside diameter D3 of the pin 50, and an annular radial leg 58 which extends outwardly from the inner end of the axial leg. A collar is located on each end of the pin 50 with the radial leg 58 extending between the inwardly facing face 38 of the ear 26 and the outer end of the bushing 46. The cylindrical axial leg 56 surrounds the pin and extends through the first bore 28. The axial leg is configured such that its outer surface abuts the first bore and its inner surface abuts the pin 50. The axial leg extends slightly outwardly from the end of the pin 50. The collars have slots 60 extending through them which are aligned with the slots 30 in the ears 26.

Compressible inner washers 62, having a diameter which is less than or equal to the inside diameter of the axial leg 56, are located at each end of the pin 50 and a non-compressible outer washer 64, having a diameter which is greater than the inside diameter of the axial leg, is placed against each inner washer. A bolt 66 extends through the washers at one end of the pin, through a hole 52 in the pin and through the washers at the other end of the pin. A nut 68 is located on the threaded end of the bolt 66.

The pin 50 couples the second housing 16 rotatably to the first housing 12. Thus, when the first housing is attached to the front surface of a trailer or dolly 14 with the pin 50 oriented horizontally, the interconnected housings can turn relative to one another. By tightening the nut 68 on the bolt 66 the non-compressible washers 64 push the collars 54 inwardly toward one another. This in turn pushes the bushings 46 into the second bores 44, thereby compressing the bushings. As the bushings are compressed, the third bores 48 are constricted against the pin 50 which increases the resistance against rotation of the bushings on the pin, and therefore the rotation of the second housing relative to the first housing. Once the desired tension is achieved, the bolts 36 are tightened in the nuts 37 to squeeze the flanges 32 together and lock the tightening mechanism at this tension.

Because the compressible washers 62 are between the non-compressible washers 64 and the ends of the pin, when the nut 68 is tightened on the bolt 66 the bushings remain centered in the second housing and the second housing remains centered in the first housing which creates a more predictable and uniform tension against rotation of the second housing relative to the first housing.

What is claimed is:

1. A tightening mechanism for a hinge assembly comprising:
   (a) a first housing having a pair of outwardly extending spaced apart ears;
   (b) said ears having aligned first bores extending through them
   (c) a second housing having a length allows it to fit between said ears:
   (d) said second housing having a pair of abutting it second bores located therein, said second bores being tapered inwardly toward one another;
   (e) a pair of tapered cylindrical bushings which are configured to fit within said second bores and which have a combined length which is greater than the length of said second housing;
   (f) said tapered bushings having aligned third bores extending through them which are coaxial with one another and with said second bores when said bushings are placed in said second bores;
   (g) said second and third bores being coaxial with said first bores when said second housing is placed in said first housing between said ears;
   (h) a coupling mechanism which extends through said third bores and holds said second housing rotatably in said first housing; and
   (i) a clamping mechanism which is configured to continuous urge said bushings toward one another, and inwardly into said second bores;
   wherein said coupling mechanism comprises an elongate cylindrical pin having an outside diameter substantially equal to the diameter of said third bores; and
   wherein said clampimg mechanism comprises:
      (i) said pin having a hole extending longitudinally therethrough, and a length sufficient to extend through both of said ears;
      (ii) a pair of collars having an L-shaped cross-section with a cylindrical axial leg having an inside diameter substantially equal to the outside diameter of said pin and an outside diameter substantially equal to the diameter of said first bores, and an annular radial leg which extends radially outwardly from said pin and contacts a respective bushing;
      (iii) a bolt which extends through said hole and said pin; and
      (iv) a nut which is threadably engaged on said bolt.

2. The tightening mechanism of claim 1 wherein said clamping mechanism further comprises one or more washers on the ends of said bolt.

3. The tightening mechanism of claim 2 wherein said washers include:
   (a) a compressible inner washer having a diameter which is equal to or less than the inside diameter of said cylindrical longitudinal leg; and
   (b) a non-compressible outer washer having a diameter which is greater than the inside diameter of said cylindrical longitudinal leg.

4. A tightening mechanism for a hinge assembly comprising:
   (a) a first housing having a pair of outwardly extending spaced apart ears;
   (b) said ears having aligned first bores extending through them;
   (c) a second housing having a length which allows it to fit between said ears;
   (d) said second housing having a pair of abutting second bores located therein, said second bores being tapered inwardly toward one another;
   (e) a pair of tapered cylindrical bushings which are configured to fit within said second bores and which have a combined length which is greater than the length of said second housing;
   (f) said tapered bushings having aligned third bores extending through them which are coaxial with one another and with said second bores when said bushings are placed in said second bores;
   (g) said second and third bores being coaxial with said first bores when said second housing is placed in said first housing between said ears;
   (h) a coupling mechanism which extends through said third bores and holds said second housing rotatably in said first housing;
   (i) a clamping mechanism which urges said bushings toward one another, and inwardly into said second bores;
   (j) wherein said coupling mechanism comprises an elongate cylindrical pin having an outside diameter substantially equal to the diameter of said third bores; and
   (k) said clamping mechanism comprises:
      (i) said pin having a hole extending longitudinally therethrough, and a length sufficient to extend through both of said ears;
      (ii) a pair of collars having an L-shaped cross-section with a cylindrical axial leg having an inside diameter substantially equal to the outside diameter of said pin and an outside diameter substantially equal to the diameter of said first bores, and an annular radial leg which extends radially outwardly from said pin and contacts a respective bushing;
      (iii) a bolt which extends through said hole and said pin; and
      (iv) a nut which is threadably engaged on said bolt.

5. The tightening mechanism of claim 4 wherein said clamping mechanism further comprises one or more washers on the ends of said bolt.

6. The tightening mechanism of claim 5 wherein said washers include:
   (a) a compressible inner washer having a diameter which is equal to or less than the inside diameter of said cylindrical longitudinal leg; and
   (b) a non-compressible outer washer having a diameter which is greater than the inside diameter of said cylindrical longitudinal leg.

* * * * *

UNITED STATES PATENT AND TRADEMARK OFFICE
CERTIFICATE OF CORRECTION

PATENT NO. : 9,108,478 B2  
APPLICATION NO. : 13/927558  
DATED : August 18, 2015  
INVENTOR(S) : Grycko et al.

Page 1 of 1

It is certified that error appears in the above-identified patent and that said Letters Patent is hereby corrected as shown below:

In the Claims:

Col. 3, line 20, (d) in Claim 1, "abutting it second" should read --abutting second--

Signed and Sealed this  
Ninth Day of August, 2016

Michelle K. Lee  
*Director of the United States Patent and Trademark Office*